United States Patent
Totolos, Jr.

(10) Patent No.: US 7,836,331 B1
(45) Date of Patent: Nov. 16, 2010

(54) SYSTEM AND METHOD FOR PROTECTING THE CONTENTS OF MEMORY DURING ERROR CONDITIONS

(75) Inventor: George Totolos, Jr., Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 459 days.

(21) Appl. No.: 11/748,972

(22) Filed: May 15, 2007

(51) Int. Cl.
G06F 11/00 (2006.01)
(52) U.S. Cl. ......................................................... 714/5
(58) Field of Classification Search ....................... 714/5
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,870,643 A | 9/1989 | Bultman et al. |
| 4,899,342 A | 2/1990 | Potter et al. |
| 4,989,205 A | 1/1991 | Dunphy, Jr. et al. |
| 4,989,206 A | 1/1991 | Dunphy, Jr. et al. |
| 5,077,736 A | 12/1991 | Dunphy, Jr. et al. |
| 5,088,081 A | 2/1992 | Farr |
| 5,101,492 A | 3/1992 | Schultz et al. |
| 5,128,810 A | 7/1992 | Halford |
| 5,148,432 A | 9/1992 | Gordon et al. |

(Continued)

OTHER PUBLICATIONS

Bultman, David L., High Performance SCSI Using Parallel Drive Technology, In Proc. BUSCON Conf., pp. 40-44, Anaheim, CA, Feb. 1988.

(Continued)

*Primary Examiner*—Marc Duncan
(74) *Attorney, Agent, or Firm*—Cesari and McKenna, LLP

(57) ABSTRACT

A system and method protects the contents of memory during error conditions. An illustrative storage system includes a complex programmable logic device (CPLD) that interfaces with a memory controller and a basic input output system (BIOS) for ensuring that the system memory is maintained in a self refresh state in the event of an error condition. The memory controller is configured to, in response to receiving a signal from the CPLD, cause the memory to enter the self refresh state where it is maintained by a battery subsystem (or alternate power sources). Accordingly, data contained within the memory may be replayed to persistent storage upon correction of the error condition via, for example, a system re-initialization.

36 Claims, 6 Drawing Sheets

U.S. PATENT DOCUMENTS

| | | | |
|---|---|---|---|
| RE34,100 E | 10/1992 | Hartness | |
| 5,163,131 A | 11/1992 | Row et al. | |
| 5,166,936 A | 11/1992 | Ewert et al. | |
| 5,179,704 A | 1/1993 | Jibbe et al. | |
| 5,202,979 A | 4/1993 | Hillis et al. | |
| 5,208,813 A | 5/1993 | Stallmo | |
| 5,210,860 A | 5/1993 | Pfeffer et al. | |
| 5,218,689 A | 6/1993 | Hotle | |
| 5,233,618 A | 8/1993 | Glider et al. | |
| 5,235,601 A | 8/1993 | Stallmo et al. | |
| 5,237,658 A | 8/1993 | Walker et al. | |
| 5,257,367 A | 10/1993 | Goodlander et al. | |
| 5,274,799 A | 12/1993 | Brant et al. | |
| 5,305,326 A | 4/1994 | Solomon et al. | |
| 5,313,626 A | 5/1994 | Jones et al. | |
| 5,351,246 A | 9/1994 | Blaum et al. | |
| 5,355,453 A | 10/1994 | Row et al. | |
| 5,410,667 A | 4/1995 | Belsan et al. | |
| 5,414,861 A * | 5/1995 | Horning | 365/229 |
| 5,463,766 A | 10/1995 | Schieve et al. | |
| 5,485,579 A | 1/1996 | Hitz et al. | |
| 5,537,567 A | 7/1996 | Galbraith et al. | |
| 5,579,475 A | 11/1996 | Blaum et al. | |
| 5,596,708 A * | 1/1997 | Weber | 714/6 |
| 5,623,595 A | 4/1997 | Bailey | |
| 5,802,366 A | 9/1998 | Row et al. | |
| 5,805,788 A | 9/1998 | Johnson | |
| 5,812,753 A | 9/1998 | Chiariotti | |
| 5,819,292 A | 10/1998 | Hitz et al. | |
| 5,862,158 A | 1/1999 | Baylor et al. | |
| 5,884,098 A | 3/1999 | Mason, Jr. | |
| 5,918,001 A | 6/1999 | Ueno et al. | |
| 5,931,918 A | 8/1999 | Row et al. | |
| 5,941,972 A | 8/1999 | Hoese et al. | |
| 5,956,475 A | 9/1999 | Burckhartt et al. | |
| 5,963,962 A | 10/1999 | Hitz et al. | |
| 5,974,544 A | 10/1999 | Jeffries et al. | |
| 5,974,546 A | 10/1999 | Anderson | |
| 6,012,130 A | 1/2000 | Beyda et al. | |
| 6,014,744 A | 1/2000 | McKaughan et al. | |
| 6,038,570 A | 3/2000 | Hitz et al. | |
| 6,065,037 A | 5/2000 | Hitz et al. | |
| 6,092,215 A | 7/2000 | Hodges et al. | |
| 6,138,125 A | 10/2000 | DeMoss | |
| 6,138,201 A | 10/2000 | Rebalski | |
| 6,158,017 A | 12/2000 | Han et al. | |
| 6,189,114 B1 | 2/2001 | Orr | |
| 6,223,300 B1 | 4/2001 | Gotoh | |
| 6,233,108 B1 | 5/2001 | Inoue | |
| 6,282,670 B1 | 8/2001 | Rezaul Islam et al. | |
| 6,336,174 B1 * | 1/2002 | Li et al. | 711/162 |
| 6,425,035 B2 | 7/2002 | Hoese et al. | |
| 6,434,711 B1 | 8/2002 | Takiyanagi | |
| 6,442,711 B1 | 8/2002 | Sasamoto et al. | |
| 6,477,482 B1 | 11/2002 | Maupin et al. | |
| 6,532,548 B1 | 3/2003 | Hughes | |
| 6,581,185 B1 | 6/2003 | Hughes | |
| 6,625,754 B1 | 9/2003 | Aguilar et al. | |
| 6,701,464 B2 | 3/2004 | Austen et al. | |
| 6,763,456 B1 | 7/2004 | Agnihotri et al. | |
| 6,785,807 B1 | 8/2004 | Aguilar et al. | |
| 6,807,643 B2 | 10/2004 | Eckardt et al. | |
| 6,854,071 B2 | 2/2005 | King et al. | |
| 6,950,966 B2 | 9/2005 | Chiquoine et al. | |
| 6,993,701 B2 | 1/2006 | Corbett et al. | |
| 7,039,755 B1 | 5/2006 | Helms | |
| 7,055,057 B2 | 5/2006 | Achiwa | |
| 7,131,026 B2 | 10/2006 | Denninghoff et al. | |
| 7,143,298 B2 | 11/2006 | Wells et al. | |
| 7,178,061 B2 | 2/2007 | Aasheim et al. | |
| 7,380,055 B2 * | 5/2008 | Ashmore | 711/112 |
| 7,392,429 B2 | 6/2008 | Frank et al. | |
| 7,724,604 B2 | 5/2010 | Amidi | |
| 2002/0184574 A1 * | 12/2002 | Mackey et al. | 714/47 |
| 2004/0030668 A1 | 2/2004 | Pawlowski | |
| 2005/0283648 A1 * | 12/2005 | Ashmore | 714/5 |
| 2006/0136765 A1 * | 6/2006 | Poisner et al. | 713/323 |
| 2007/0168717 A1 * | 7/2007 | Chang et al. | 714/14 |
| 2008/0092016 A1 * | 4/2008 | Pawlowski | 714/764 |
| 2008/0270776 A1 | 10/2008 | Totolos, Jr. | |

OTHER PUBLICATIONS

Gibson, Garth A., et al., Coding Techniques for Handling Failures in Large Disk Arrays, Technical Report UCB/CSD 88/477, Computer Science Division, University of California, Jul. 1988.

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al.., Strategic Directions in Storage I/O Issues in Large-Scale Computing, ACM Computing Survey, 28(4):779-93, Dec. 1996.

Hitz, Dave et al., File System Design for an NFS File Server Appliance, Technical Report 3002, Rev. C395, presented Jan. 19, 1994, 23 pages.

Katz, Randy H. et al., Disk System Architectures for High Performance Computing, Proceedings of the IEEE, vol. 77, No. 12, pp. 1842-1858, Dec. 1989.

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

* cited by examiner

SYSTEM AND METHOD FOR PROTECTING THE CONTENTS OF MEMORY DURING ERROR CONDITIONS

FIELD OF THE INVENTION

The present invention relates to computer memory systems and, more particularly, to protecting the contents of memory during error conditions.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In addition to volatile (system) memory, certain storage systems may also include non-volatile random access memory (NVRAM) that may be utilized to temporarily store received data before the data is committed to final persistent storage, such as disks. By using NVRAM in a storage system, an increase in performance is realized by clients of the storage system when issuing write requests to the system. Typically, a storage system may not acknowledge receipt of a write request and its associated write data until such time as the data has been persistently stored on disk. By temporarily storing the received write data in persistent NVRAM, the storage system may acknowledge the write request with shorter latency as compared to storing data directly to disks. Furthermore, in such NVRAM equipped storage systems, should an error condition occur, upon initialization of the system the data may be replayed from the NVRAM to disks to bring the disks to a consistent state. Thus, NVRAM enables improved write performance and protection of system memory against data loss during initialization of the storage system.

However, a noted disadvantage of conventional storage systems that use NVRAM is that the added complexity of managing both volatile and nonvolatile memory substantially increases the overall cost of the systems without providing complete protection against the loss of data during operation of the systems. That is, the use of NVRAM consumes resources of the systems by, e.g., requiring one or more additional copy operations when handling write requests, while still rendering the systems vulnerable to data loss during the handling of those requests. For example, write data associated with a write request is received by a protocol stack executing on the storage system and is first stored in volatile memory, e.g., internal buffers of a memory controller, before being copied to the NVRAM. Thus, the storage system necessitates an additional copy operation to render the data nonvolatile. Furthermore, should an error condition occur while the data is copied from the memory controller buffers to the NVRAM, the write data contained within the buffers may be lost.

SUMMARY OF THE INVENTION

The present invention overcomes the disadvantages of the prior art by providing a system and method for protecting the contents of memory during error conditions without requiring a separate non-volatile memory subsystem. In accordance with an illustrative embodiment of the present invention, a memory controller is configured to place memory into a self-refresh mode to preserve the contents of the memory. By incorporating the self-refresh functionality within the memory controller, improved speeds are possible. An illustrative storage system includes a logic device, such as a complex programmable logic device (CPLD), adapted to interface with a memory controller and a basic input output system (BIOS). Upon detection of an error condition, the memory controller protects the contents of the memory, e.g., a system memory of the storage system, to place the memory in a self refresh state, i.e., maintained by batteries of a battery subsystem (or alternate power sources). Notably, the memory controller flushes any data contained within its internal buffers to the memory prior to instructing the memory to enter the self refresh state. The memory controller thus ensures that its buffered data is persistently stored in the memory, thereby protecting the system from data loss.

Specifically, in response to receiving a signal from the CPLD, the memory controller causes the memory to enter the self refresh state where alternate power is provided to the memory to enable, among other things, refresh operations. Accordingly, data contained within the memory may be replayed to persistent storage upon correction of the error condition via, for example, a system re-initialization. In the event of a normal shutdown operation, the CPLD may deactivate the battery subsystem, thereby prolonging battery life. Thus, the CPLD ensures that the memory is protected, i.e., refreshed, only when data needs be maintained.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

The present invention provides a system and method for protecting the contents of memory during error conditions. An illustrative storage system includes a logic device, such as a complex programmable logic device (CPLD), adapted to interface with a memory controller and a basic input output system (BIOS) to ensure that the system memory is maintained in a self refresh state in the event of an error condition. The memory controller is configured to, in response to receiving a signal from the CPLD, cause the memory to enter the self refresh state where it is maintained by a battery subsystem (or alternate power sources) configured to provide alternate power to the memory. Accordingly, data contained within the memory may be replayed to persistent storage upon correction of the error condition via, for example, a system re-initialization.

A. Storage System Environment

Figure 1:
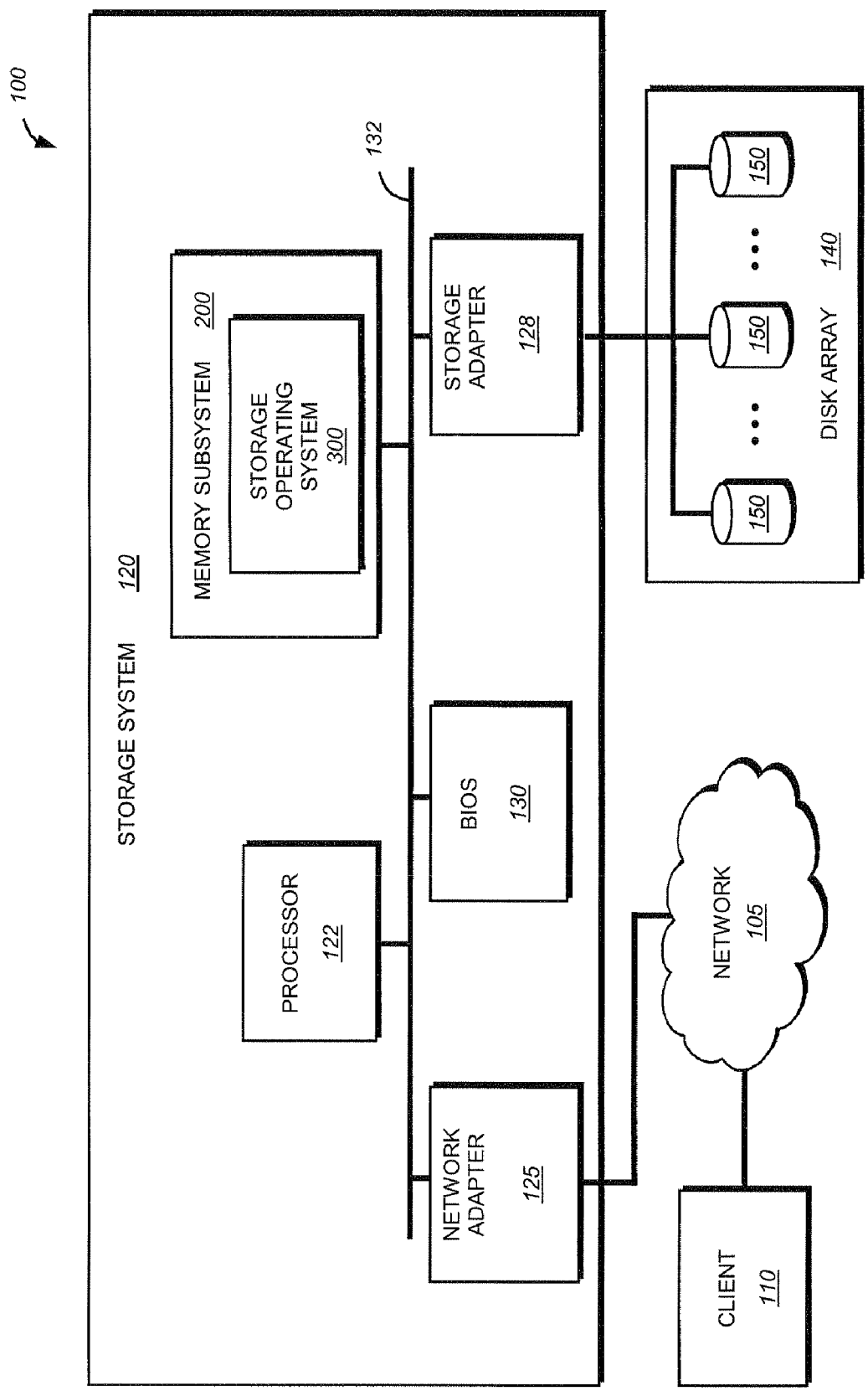
FIG. 1 is a schematic block diagram of an exemplary storage system environment in accordance with an illustrative embodiment of the present invention.

FIG. 1 is a schematic block diagram of an environment 100 including a storage system 120 that may be advantageously used with the present invention. The inventive technique described herein may apply to any type of special-purpose (e.g., file server) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 120 comprises a processor 122, a memory subsystem 200, a network adapter 125, a storage adapter 128 and a basic input output system (BIOS) 130 interconnected by a system bus 132. The memory subsystem 200 includes a system memory, described further below, comprising storage locations that are addressable by the processor and adapters for storing software program code and data structures associated with the present invention. The processor and adapters may, in turn, comprise processing elements and/or logic circuitry configured to execute the software code and manipulate the data structures. A storage operating system 300, portions of which is typically resident in the system memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 125 comprises a plurality of ports adapted to couple the storage system 120 to one or more clients 110 over point-to-point links, wide area networks, virtual private networks implemented over a public network (Internet) or a shared local area network (hereinafter "network 105"). The network adapter 125 thus may comprise the mechanical, electrical and signaling circuitry needed to connect the storage system to the network 105, such as a computer network. Illustratively, the network 105 may be embodied as an Ethernet network or a Fibre Channel (FC) network. Each client 110 may communicate with the storage system 120 over network 105 by exchanging discrete frames or packets of data according to pre-defined protocols, such as TCP/IP.

The storage adapter 128 cooperates with the storage operating system 300 executing on the system 120 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 150, such as HDD and/or DASD, of array 140. The storage adapter includes input/output (I/O) interface circuitry that couples to the disks over an I/O interconnect arrangement, such as a conventional high-performance, FC serial link topology.

Storage of information on array 140 is preferably implemented as one or more storage "volumes" that comprise a cluster of physical storage disks 150, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

B. Memory Subsystem

Figure 2:
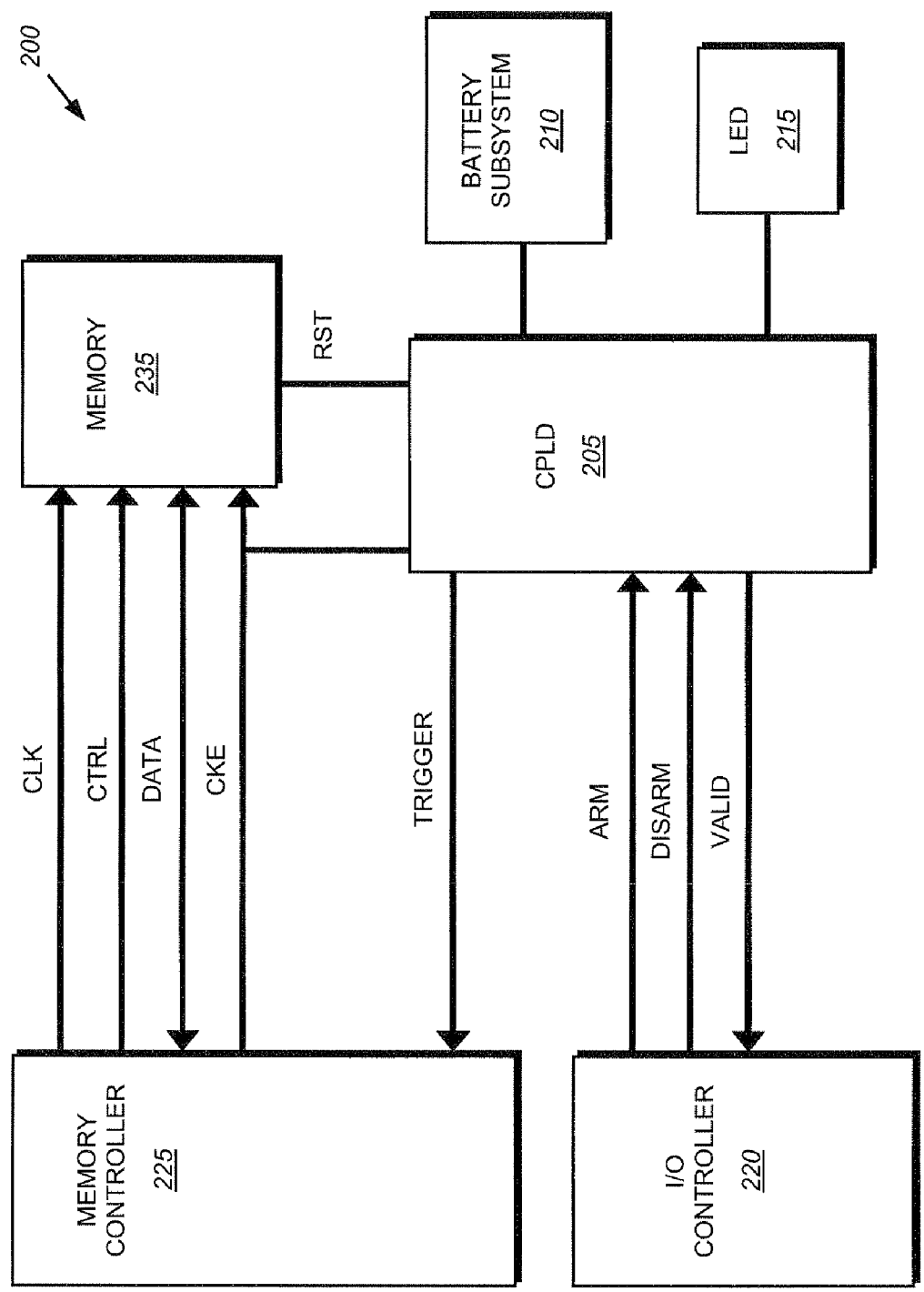
FIG. 2 is a schematic block diagram of an exemplary memory subsystem of a storage system in accordance with an illustrative embodiment of the present invention.

FIG. 2 is a schematic block diagram of an exemplary memory subsystem 200 in accordance with an illustrative embodiment of the present invention. The memory subsystem 200 includes a complex programmable logic device (CPLD) 205 that monitors the "health" of the storage system for events that may put the memory subsystem at risk, e.g. a system reset and/or power loss. Illustratively, the CPLD 205 may be implemented as a FPGA; however, in alternate embodiments the CPLD may be implemented using other forms of hardware, software, firmware or a combination thereof.

Operatively interconnected with the CPLD 205 are a battery subsystem 210 and a light emitting diode (LED) 215. The battery subsystem 210 illustratively comprises one or more batteries and/or related circuitry for providing power for refresh operations to a system memory 235 when the main power of the storage system has been disconnected. In an illustrative embodiment, the battery subsystem 210 includes redundancy to ensure that the power supplied by the subsystem 210 is reliable. For example, the battery subsystem 210 may include a set of redundant batteries with associated circuitry to enable switching in a replacement battery in the event that one of the batteries fail. Illustratively, the system memory may comprise one or more dual in-line memory modules (DIMMs); however, in alternate embodiments the memory 235 may be implemented using other form factors. The LED 215, which may comprise a light emitting diode or other form of signal indicator, is utilized by the memory subsystem 200 to indicate to administrators when the CPLD 205 is currently protecting system memory 235. More generally, the LED 215 may comprise any form of a user visible indicator. Thus, for example, in the event of a power loss, if a memory controller 225 is protecting memory 235 due to, e.g., the CPLD asserting a TRIGGER signal, the LED 215 may be illuminated to indicate to an administrator that operations that impact the validity of data in the memory subsystem should not be performed, e.g., replacing physical memory modules, such as DIMMS, etc.

The CPLD 205 is also operatively interconnected with the memory controller 225 via the TRIGGER signal. Illustratively, the memory controller 225 enables access to system memory 235 by the processor 122 and/or other devices, for example, adapters 125,128. In accordance with an illustrative embodiment of the invention, upon detecting an error condition, the CPLD 205 may activate the TRIGGER signal to the memory controller 225, thereby causing the controller to instruct the memory 235 to enter a self refresh state. The error condition may comprise, e.g., the loss of power supplied to the system, power irregularities, such as voltages and/or currents being outside of predefined limits, etc. Furthermore, the error condition may be the result of a failure of a component that causes the component to transmit spurious signals to the memory controller. Notably, the TRIGGER signal is activated by the CPLD 205 when an error is detected that could compromise the contents of memory 235. Furthermore, in response to activation of the TRIGGER signal, the memory controller 225 flushes any data contained within its internal buffers to the memory 235 prior to instructing the memory to enter the self refresh state. Thus, the memory controller ensures that its buffered data is persistently stored in the memory. Illustratively, the TRIGGER signal is maintained as active until the memory is determined to be in the self refresh state.

The memory controller 225 is illustratively coupled to the memory 235 via a plurality of signal buses. Illustrative signal buses include a clock bus (CLK), a control bus (CTRL), a DATA bus, and a clock enabled bus (CKE). The CLK bus is utilized by the memory controller to provide a system clock to the memory. The CTRL bus is utilized for passing control signals between the memory controller 225 and the memory 235. The DATA bus is utilized for transferring data to/from the memory. The CKE bus is utilized by the memory controller to signal that the memory is in the self refresh state. Illustratively, the CPLD 205 monitors the CKE bus to ensure that the memory is in self refresh. The CPLD 205 is further coupled to the memory 235 via a reset (RST) signal that is utilized when the CPLD causes the memory to remain in a low power mode.

Further, an I/O controller 220 is operatively interconnected with the CPLD 205 and the BIOS 130. The CPLD 205 is illustratively interconnected with the I/O controller 220 via three signal lines carrying signals such as, for example, ARM, DISARM and VALID. The ARM signal is directed from the BIOS 130 and I/O controller 220 to the CPLD 205 and is utilized by software, such as the operating system 300, to arm the memory protection system. Illustratively, the ARM signal is active when set to high and will only be consider asserted if the DISARM signal is also set as low to thereby prevent inadvertent arming. The DISARM signal is issued from the I/O controller 220 to the CPLD to enable software, such storage operating system 300, to disarm the memory subsystem 200 for a clean shutdown. As noted, for either the ARM or DISARM signal to be considered set, the other, opposite signal must be cleared. The VALID signal is directed from the CPLD 205 to the I/O controller 220 and is utilized to inform the I/O controller (and ultimately the BIOS 130) that the memory 235 is currently in a self refresh and protected mode.

C. Storage Operating System

To facilitate access to the disks, the storage operating system 300 implements a write-anywhere file system that cooperates with virtualization modules to provide a virtualization system that "virtualizes" the storage space provided by the disks. The file system logically organizes information stored in the storage space as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize the information as a hierarchical structure of named virtual disks (vdisks) on the disks, thereby providing an integrated NAS and SAN system approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "Data ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP® storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. An example of a storage system that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, by Brian Pawlowski, et al., filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
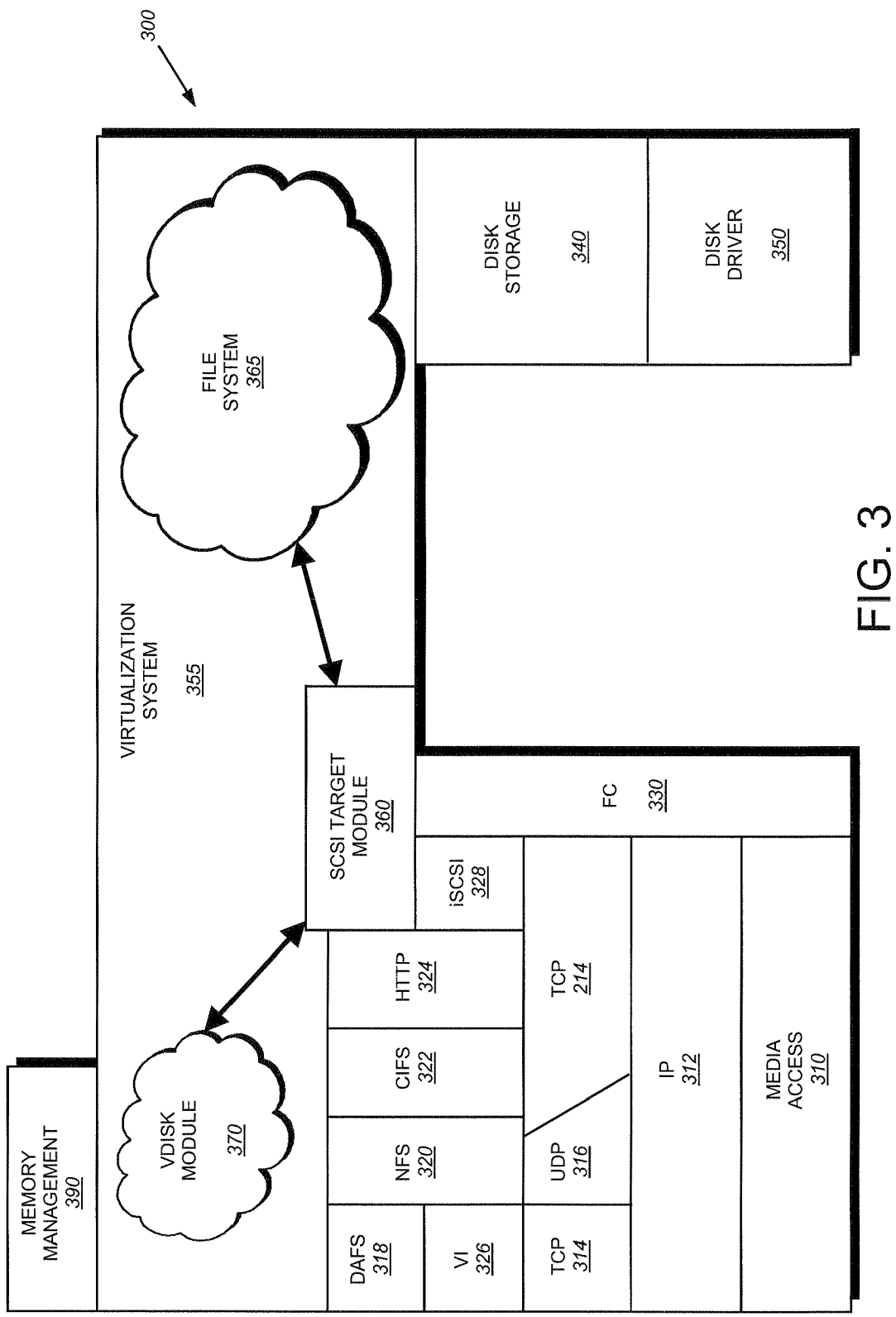
FIG. 3 is a schematic block diagram of an exemplary storage operating system for use on a storage system in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the multi-protocol storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the Network File System (NFS) protocol 320, the Common Internet File System (CIFS) protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates with the network adapter to receive and transmit block access requests and responses to and from the storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage system. In addition, the storage operating system includes a disk storage layer 340, such as a RAID system, that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system 365 and SCSI target module 360 can be implemented in software, hardware, firmware, or a combination thereof. The vdisk module 370 interacts with the file system 365 to enable access by administrative interfaces in response to a system administrator issuing commands to the multi-protocol storage system 120. In essence, the vdisk module 370 manages SAN deployments by, among other things, implementing a comprehensive set of vdisk (lun) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or lun by providing a mapping procedure that translates luns into the special vdisk file types. The SCSI target module is illustratively disposed between the FC and iSCSI drivers 330, 328 and the file system 365 to thereby provide a translation layer of the virtualization system 355 between the SAN block (lun) space and the file system space, where luns are represented as vdisks. By "disposing" SAN virtualization over the file system 365, the multi-protocol storage system reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

Operationally, a request from the client 110 is forwarded as a packet over the computer network 105 and onto the storage system 120 where it is received at the network adapter 125. A network driver processes the packet and, if appropriate, passes it on to a network protocol and file access layer for additional processing prior to forwarding to the write-anywhere file system 365. Here, the file system generates operations to load (retrieve) the requested data from disk 150 if it is not resident "in-core," i.e., in the memory subsystem 200. If the information is not in the memory, the file system 365 indexes into the inode file using the inode number to access an appropriate entry and retrieve a logical volume block number (vbn). The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk 150 and loads the requested data block(s) in memory for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapter 125, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

Figure 5:
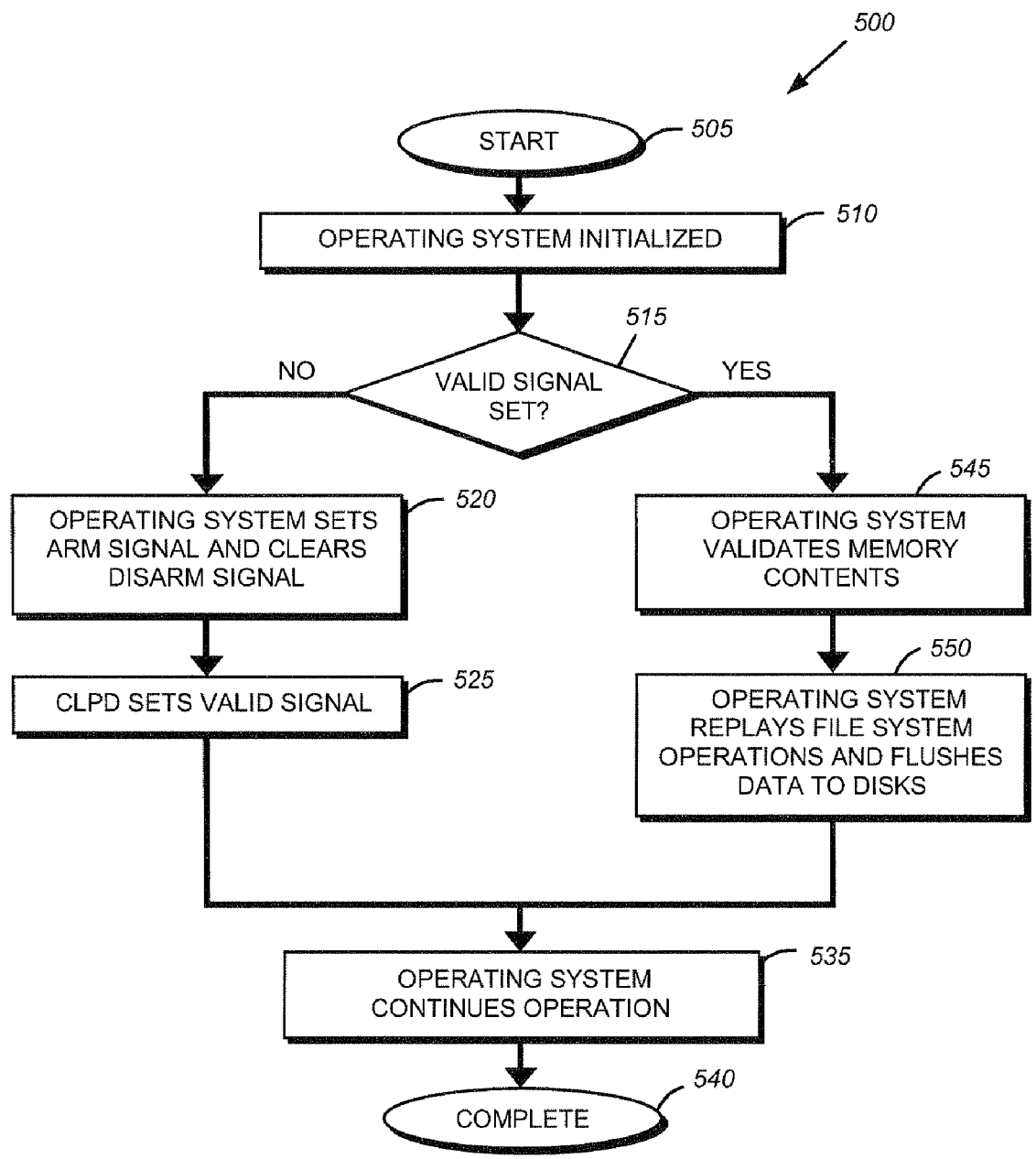
FIG. 5 is a flow chart detailing the steps of a procedure for initializing an operating system in accordance with an illustrative embodiment of the present invention.

A memory management module 390 of the storage operating system 300 illustratively interfaces with the BIOS 130 and/or CPLD 205 to ensure that data maintained in system memory 235 is persistently stored during system initialization. The memory management module 390 illustratively performs system memory management, such as that described further below in reference to procedure 500 (FIG. 5).

D. Memory Protection

The present invention provides a system and method for protecting the contents of memory during error conditions. An illustrative storage system includes a logic device, such as a CPLD that interfaces with a memory controller and a BIOS to protect the contents of the memory, e.g., a system memory of the storage system, in the event of an error condition. To that end, the CPLD, memory controller and BIOS cooperate to ensure that the system memory is maintained in a self refresh state, i.e., maintained by batteries of a battery subsystem (or alternate power sources). In response to receiving a signal from the CPLD, the memory controller causes the memory to enter a self refresh state where alternate power is provided to the memory to enable, among other things, refresh operations. Accordingly, data contained within the memory may be replayed to persistent storage upon correction of the error condition via, for example, a system re-initialization. In the event of a normal shutdown operation, the CPLD may deactivate the battery subsystem, thereby prolonging battery life. Thus, the CPLD ensures that the memory is protected, i.e., refreshed, only when data needs be maintained.

During initialization of the storage system, the BIOS illustratively determines whether a VALID signal has been set, thereby signifying that the system is currently protecting the contents of memory. If the VALID signal is not set, then memory is not being maintained and the system performs a conventional memory interface initialization procedure before loading the operating system. However, if the VALID signal has been set, the BIOS first initializes any unprotected memory banks. To preserve battery power, the memory may be segregated into a plurality of banks of which only a portion is maintained in a self refresh state. Any unprotected memory banks are initialized prior to the BIOS restoring chipset registers. The ARM signal is then set, while the DISARM signal is cleared.

Once initialized, the operating system determines whether the VALID signal has been set. If the VALID signal has not been set, then the CPLD is not protecting any data contained within the memory and the operating system therefore sets the ARM signal and clears the DISARM signal, which causes the CPLD to set the VALID signal. However if during initialization the VALID signal is set, then the CPLD is currently protecting the contents of the memory and the operating system validates those memory contents before replaying data stored in the memory to disk (or another storage device) for persistent storage.

Upon detecting a shutdown operation, the CPLD determines whether or not the shutdown is a "clean" shutdown. As used herein, a clean shutdown is a shutdown operation that is not the result of an error condition. An exemplary clean shutdown operation is a user initiated shutdown. A non-clean shutdown operation is any shutdown caused by an error condition, e.g., a loss of power, damage to one or more components, etc. In response to determining that it is a clean shutdown, the operating system flushes data to disk and then sets the DISARM signal and clears the ARM signal. The CPLD then clears the VALID signal signifying that it is not currently protecting memory. The operating system thereafter clears the DISARM signal and the system powers down. However, if a clean shutdown is not detected, then the CPLD sets the TRIGGER signal to the memory controller. In response, the memory controller places the memory into the self refresh state using the battery subsystem to provide power for refresh operations.

Figure 4:
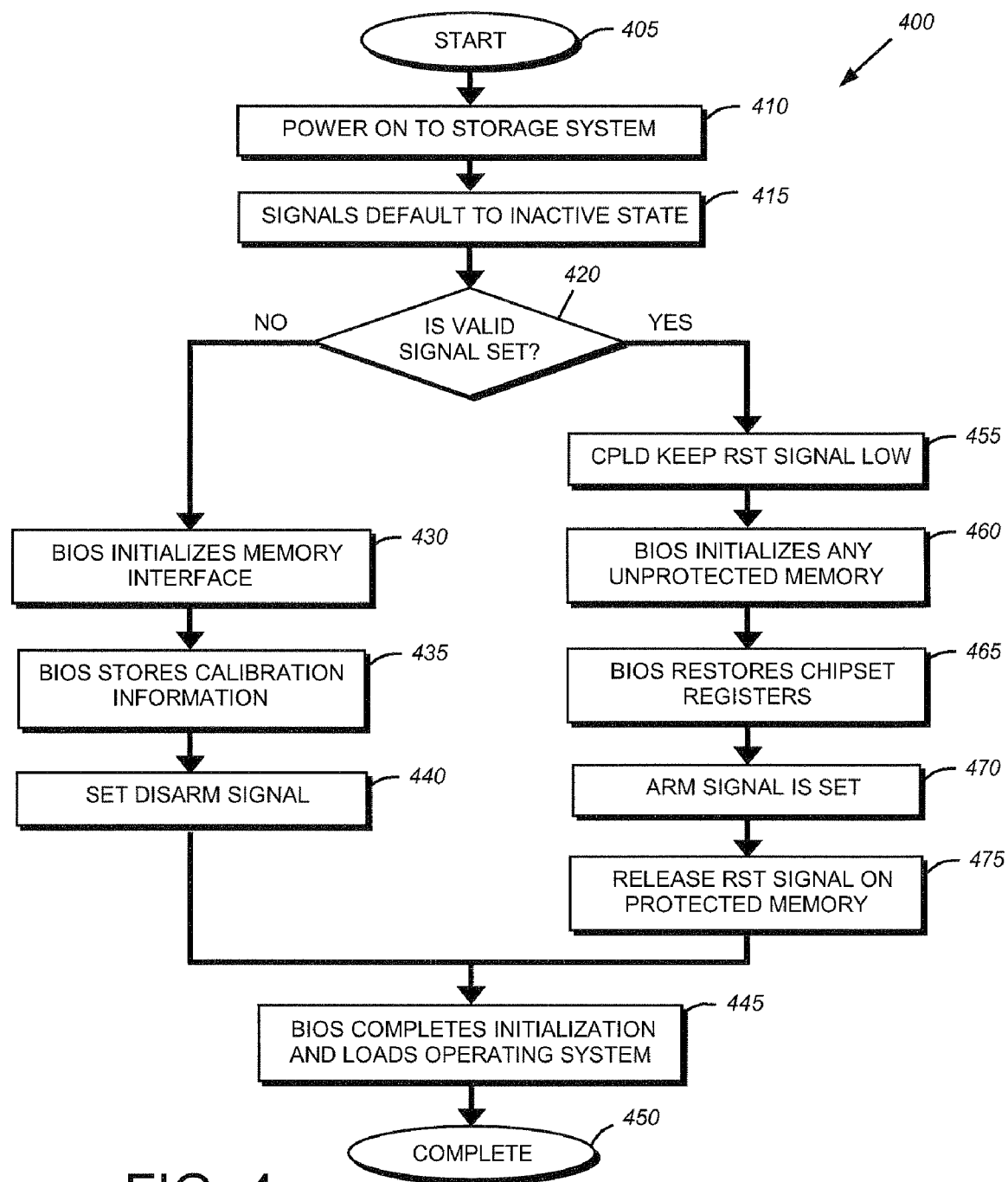
FIG. 4 is a flow chart detailing the steps of a procedure for initializing a storage system in accordance with an illustrative embodiment of the present invention.

FIG. 4 is a flow chart detailing the steps of a procedure 400 for initializing a storage system in accordance with an illustrative embodiment of the present invention. As noted, the present invention provides a system and method for ensuring protection of memory contents during error conditions. The procedure 400 begins in step 405 and continues to step 410 where power is first applied to the storage system as a result of, for example, the storage system being plugged into a power source, a restart of the storage system, etc. Illustratively during the initialization of the storage system, certain signals default to an inactive state in step 415. For example, the ARM and DISARM signals default to an inactive state, while the RST signal defaults to an active state.

In addition, the VALID signal may be set and/or cleared depending upon a previous shutdown operation. In step 420 the system determines whether the VALID signal is set. As noted above, the VALID signal is set when the contents of memory are maintained in a self refresh state. If the VALID signal is not set, then the contents of memory have not been protected, which may be due to, for example, a clean shutdown operation in which all data within the memory has been successfully stored on persistent storage prior to the shutdown completion. Once the operating system has been initialized, an illustrative memory management module 390 may detect the state of the VALID signal and perform appropriate action based on the contents of protected memory as described further below. If the VALID signal is not set in step 420, i.e., the system is not currently protecting memory, the procedure branches to step 430 where the BIOS initializes the memory interface and, in step 435, stores calibration information. This calibration information may comprise the contents of a set of chipset registers stored within non-volatile memory of the BIOS. In step 440, the BIOS sets the DISARM signal while leaving the ARM signal clear, thereby placing the memory into a disarmed mode which, in turn, indicates that the memory is not maintained in the protected self refresh state. The BIOS then completes initialization and loads the operating system in step 445 and the procedure 400 completes in step 450.

However, if in step 420 it is determined that the VALID signal has been set, thereby indicating that memory is currently protected, the procedure branches to step 455 where the CPLD maintains the RST signal as low to cause the memory to be held in the self refresh state. In step 460 the BIOS initializes any unprotected memory. In accordance with an illustrative embodiment of the present invention, the memory may be segregated into a plurality of memory banks. To preserve battery life, not all of the memory banks may be maintained while the memory is in the self refresh state. Thus, certain memory banks may require initialization. It should be noted that in an illustrative embodiment, the system is configured to ensure that contiguous memory regions are stored within the same memory bank (or within the same memory chip).

In step 465 the BIOS restores the appropriate chipset registers. Illustratively, the chip set registers identify the current state of the memory. Note that the chipset register contents may have been saved by the BIOS in persistent storage during normal initialization operations. Once the chipset registers have been restored, the BIOS sets the ARM signal in step 470, while ensuring that the DISARM signal is cleared. Once the ARM signal has been set, the RST signal is cleared in step 475, thereby releasing the reset on the protected memory. The procedure then continues to step 445 prior to completing in step 450.

FIG. 5 is a flow chart detailing the steps of a procedure 500 for initializing an operating system in accordance with an illustrative embodiment of the present invention. The procedure 500 begins in step 505 and continues to step 510 where the operating system is initialized. The operating system may be initialized by, e.g., the BIOS 130 loading appropriate portions of the operating system and passing execution to the operating system. As used herein, the term operating system should be taken to include storage operating systems and/or any other forms of operating systems, including e.g., virtual machine software, etc. Once initialized, the operating system determines whether the VALID signal is set in step 515. The operating system may make this determination via, e.g., memory management module 390. If the VALID signal is not set, which indicates that the memory is not in a protected state, the procedure branches to step 520 where the operating system sets the ARM signal and clears the DISARM signal. In response, the CPLD 205 sets the VALID signal in step 525 indicating that it is prepared to ensure that data is protected within the memory. The operating system then continues operations at 535 and the procedure 500 completes in step 540.

However, if in step 515 it is determined that the VALID signal is set, thus indicating that the CPLD is currently protecting memory, the procedure branches to step 545 where the operating system validates the memory contents. This may occur by, e.g., the operating system verifying checksum information in memory, etc. In step 550, the operating system replays file system operations and flushes data to disks or other persistent storage before proceeding to steps 535 and 540. It should be noted that, in accordance with alternate embodiments of the present invention, the operating system may perform additional and/or differing operations. As such, the description of replaying file operation should be taken as exemplary only.

Figure 6:
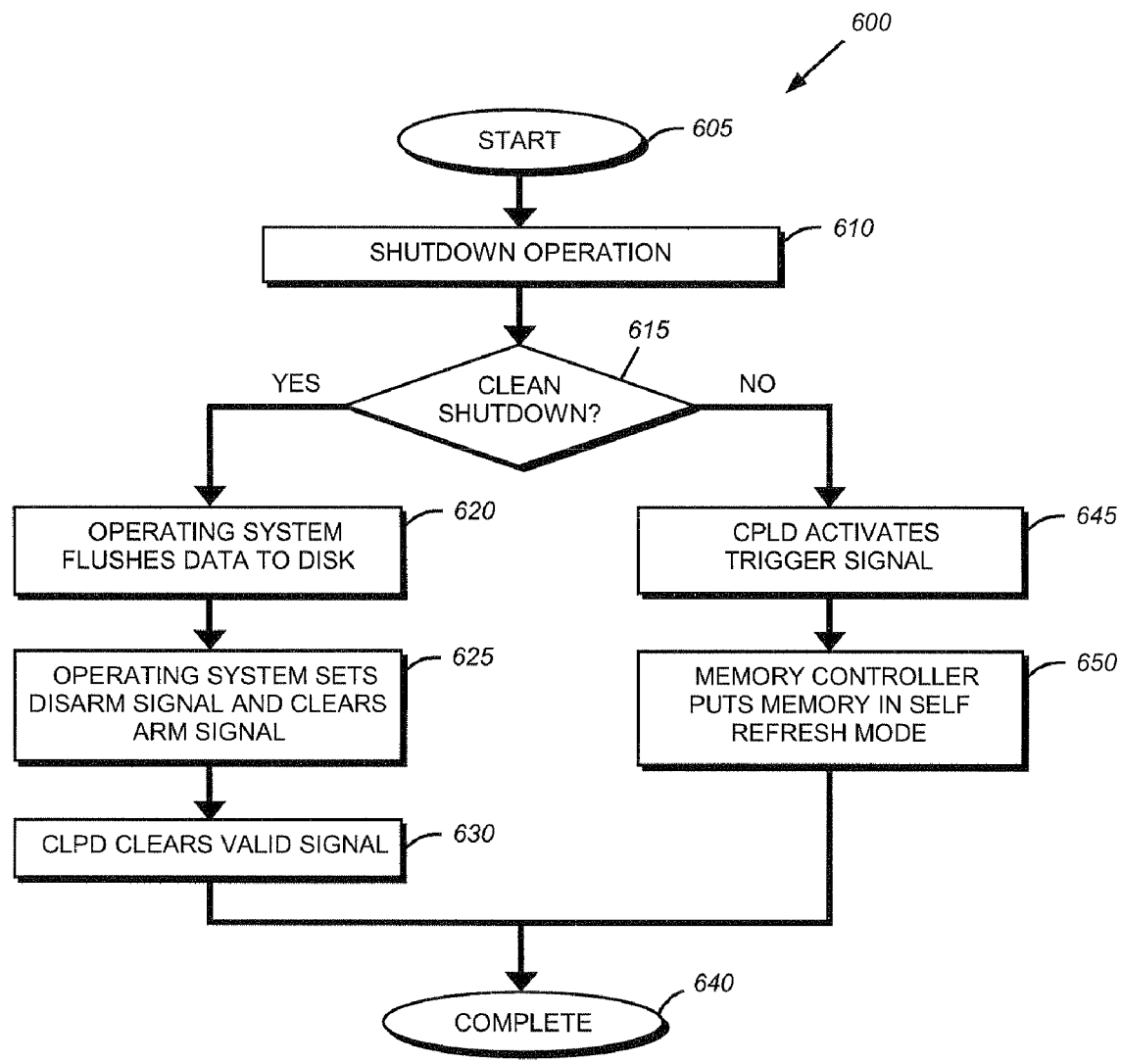
FIG. 6 is a flow chart detailing the steps of a procedure for powering off a storage system in accordance with an illustrative embodiment of the present invention.

FIG. 6 is a flow chart detailing the steps of a procedure 600 for performing a shutdown operation in accordance with an illustrative embodiment of the present invention. The procedure 600 begins in step 605 and continues to step 610 where a shutdown operation occurs. Illustratively, the shutdown operation may include, e.g., a loss of power, an administrator invoked shutdown, etc. In step 615 a determination is made whether the shutdown operation is a clean shutdown, i.e., whether the shutdown is a result of an unexpected error condition or whether it is the result of an administrator initiated action. If the shutdown operation is a clean shutdown, the procedure 600 continues to step 620 where the operating system flushes any data stored in memory to disk or other persistent storage devices, e.g., flash devices, etc. Once the operating system has flushed the appropriate data to disk, the contents of the memory no longer need to be protected as all data has been persistently stored on disk. The operating system then, in step 625, sets the DISARM signal and clears the ARM signal. In response, the CPLD clears the VALID signal in step 630. Consequently, the CPLD will not engage the battery subsystem to refresh the memory, thereby preserving battery life. Memory refresh operations are not necessary as all data has been stored persistently on disk. The procedure then completes in step 640.

However, if in step 615 it is determined that this is not a clean shutdown, the procedure 600 branches to step 645 where the CPLD asserts the TRIGGER signal to the memory controller. In response, the memory controller puts the memory into a self refresh state (mode) in step 650 by e.g., activating the battery subsystem to provide power refresh operations to the memory to preserve its contents. Illustratively, when the memory comprises memory chips that support such features, the memory controller may place the memory chips into a power conservation mode which reduces the amount of battery power necessary to maintain state by, e.g., issuing a self-refresh command. In the illustrative embodiment, once the CPLD has asserted the TRIGGER signal and the memory controller has placed the memory into a self refresh mode, the CPLD may force the memory chips to remain in a self-refresh mode by asserting the RST signal so that the CPLD can invoke a system reset to cause the system to re-initialize.

Furthermore, it should be noted that in an illustrative embodiment of the present invention, the memory controller will flush all data from its internal buffers to the memory prior to placing the memory into a self-refresh state. By flushing its internal buffers prior to placing the memory into a self-refresh state, the memory controller essentially renders the contents of its internal buffers as non-volatile, thereby decreasing the possibility of data loss due to an error condition. Additionally, the system may hold the CKE line as low, thereby keeping the memory in the self-refresh state. By maintaining the CKE lines as low, an illustrative embodiment of the present invention ensures that corrupted data and/or spurious signals sent from the memory controller as a result of the error condition do not reach the memory, thereby preventing data corruption of the contents of memory. The procedure then ends at step 640.

The foregoing description has been directed to specific embodiments of this invention. Additionally, the procedures, processes and/or modules described herein may be implemented in hardware, software, embodied as a computer-readable medium having program instructions, firmware, or a combination thereof. For example, while the term operating system is used herein, the principles of the present invention apply to storage operating systems, etc. Furthermore, while the present invention has been written in terms of loss of power, the principles of the present invention may be utilized with any error conditions. As such, the term error condition should be taken to include other failures, including, e.g., voltage and/or current fluctuations, failure of components, spurious signals sent to the memory controller, etc. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system to preserve memory, the system comprising:
a memory operatively interconnected with a memory controller and a logic device, the logic device further coupled to a battery subsystem configured to enable refresh operations to the memory, the logic device further configured to, in response to detecting an error condition, assert a signal to the memory controller causing the memory controller to place the memory in a low-power, self-refresh state, wherein the logic device is further configured to monitor a set of signal lines between the memory controller and the memory to determine whether the memory is in the low-power, self-refresh state.

2. The system of claim 1 further comprising, wherein the logic device is a customizable programmable logic device (CPLD), a basic input output system (BIOS) interconnected with the CPLD.

3. The system of claim 2 further comprising a valid signal between the BIOS and the logic device, wherein assertion of the valid signal indicates that the contents of the memory are protected.

4. The system of claim 3 wherein, in response to detecting that the valid signal is asserted, the BIOS is configured to restore a set of registers associated with the memory.

5. The system of claim 1 further comprising an indicator configured to alert an administrator when the memory is in the low-power, self-refresh state.

6. The system of claim 1 wherein the error condition comprises a loss of main power.

7. The system of claim 1 wherein the error condition comprises assertion of a reset signal.

8. The system of claim 1 wherein the memory comprises one or more dual in line memory modules.

9. The system of claim 1 wherein the logic device comprises a field programmable gate array.

10. The system of claim 1 wherein the memory controller is configured to flush contents of a set of internal buffers to the memory prior to placing the memory in the low-power, self-refresh state.

11. The system of claim 1 wherein only a portion of the memory is placed in the low-power, self-refresh state.

12. The system of claim 1 wherein the set of signal lines comprise a set of clock enable signal lines.

13. The system of claim 1 wherein the error condition comprises a system reset signal being activated.

14. The system of claim 13 wherein the logic device is configured to prevent the reset signal from propagating to the memory controller until the memory is safely in the low-power, self-refresh state.

15. The system of claim 14 wherein the logic device is further configured to, in response to detecting that the memory has been placed in the low-power, self-refresh state, asserting a reset signal to the memory controller.

16. A method for protecting memory of a computer system, comprising:
    determining whether a shutdown of the computer system is a result of an error condition or a clean shutdown;
    in response to the shutdown being a clean shutdown, flushing data from the memory to persistent storage; and
    in response to the shutdown being an error condition, asserting a trigger signal directed to a memory controller, writing, by the memory controller, contents of a set of buffers to the memory, and placing the memory into a self refresh mode.

17. The method of claim 16 wherein the error condition comprises a power loss.

18. The method of claim 16 wherein placing the memory into a self refresh mode further comprises placing only a portion of the memory into the self refresh mode.

19. The method of claim 16 further comprising disallowing, by the memory controller, operations directed to the memory from a processor.

20. A system for protecting memory of a computer system, comprising:
    means for determining whether a shutdown of the computer system is a result of an error condition or a clean shutdown;
    means for flushing data from the memory to persistent storage in response to the shutdown being a clean shutdown; and
    means for asserting a trigger signal directed to a memory controller, writing contents of a set of buffers to the memory, and placing the memory into a self refresh mode in response to the shutdown being an error condition.

21. The system of claim 20 wherein the means for placing the memory into a self refresh mode further comprises means for placing only a portion of the memory into the self refresh mode.

22. A computer readable medium containing executable program instructed executed by a processor, comprising:
    program instructions that determine whether a shutdown of a computer system is a result of an error condition or a clean shutdown;
    program instructions that flush data from memory to persistent storage in response to the shutdown being a clean shutdown; and
    program instructions that assert a trigger signal directed to a memory controller, write contents of a set of buffers of the memory controller to the memory, and place the memory into a self refresh mode in response to the shutdown being an error condition.

23. The computer readable medium of claim 22 wherein the error condition comprises a power loss.

24. The computer readable medium of claim 22 wherein the program instructions that place the memory into a self refresh mode further comprises program instructions that place only a portion of the memory into the self refresh mode.

25. A system to preserve memory contents, the system comprising:
    a processor to determine if a shutdown of the system is a result of an error condition or a clean shutdown;
    a volatile memory operatively interconnected with a memory controller and a logic device, the logic device further coupled to a battery subsystem, the memory configured to flush data stored in the memory to persistent storage in response to the shutdown of the system being a clean shutdown; and
    the logic device configured to assert a trigger signal to the memory controller causing the memory controller to place the memory into a low-power, self-refresh state in response to the shutdown being an error condition.

26. The system of claim 25 memory controller is further configured to flush contents of a set of internal buffers to the memory prior to placing the memory in the low-power, self-refresh state.

27. The system of claim 25 wherein the memory controller is configured to place the memory into the low-power, self-refresh state without software intervention.

28. The system of claim 25 wherein the memory controller is further configured to hold a set of signal lines in a state to thereby cause the memory to remain in the low-power, self refresh state and to ignore operations directed to the memory until the set of signal lines are cleared.

29. The system of claim 28 wherein the set of signal lines comprises a set of clock enabled signal lines.

30. The system of claim 28 wherein the memory controller holds the set of signal lines in the state by asserting a reset pin of a register operatively interconnected between the memory controller and the memory.

31. The system of claim 25 wherein placing the memory into the low-power, self-refresh state renders the memory non-volatile.

32. A method to preserve memory in a computer system, comprising:
    coupling the memory to a memory controller and a logic device, wherein the logic device is coupled to a battery subsystem to enable refresh operations to the memory;
    in response to detecting an error condition, asserting a signal from the logic device to the memory controller causing the memory controller to place the memory in a low-power, self-refresh state; and
    monitoring, by the logic device, a set of signal lines between the memory controller and the memory to determine whether the memory is in the low-power, self-refresh state.

33. The method of claim 32 wherein the error condition comprises a power loss.

34. The method of claim 32 wherein placing the memory into a self refresh mode further comprises placing only a portion of the memory into the self refresh mode.

35. The method of claim 32 further comprising disallowing, by the memory controller, operations directed to the memory from a processor.

36. A computer readable medium containing executable program instructions executed by a processor, comprising:

program instructions that couple a memory to a memory controller and a logic device, wherein the logic device is coupled to a battery subsystem to enable refresh operations to the memory;

program instructions that assert a signal from the logic device to the memory controller causing the memory controller to place the memory in a low-power, self-refresh state in response to detecting an error condition; and program instructions that monitor, by the logic device, a set of signal lines between the memory controller and the memory to determine whether the memory is in the low-power, self-refresh state.

\* \* \* \* \*